May 14, 1929.   T. B. FARRINGTON   1,713,273
SECTIONAL MILLING CUTTER
Filed March 6, 1922   3 Sheets-Sheet 1
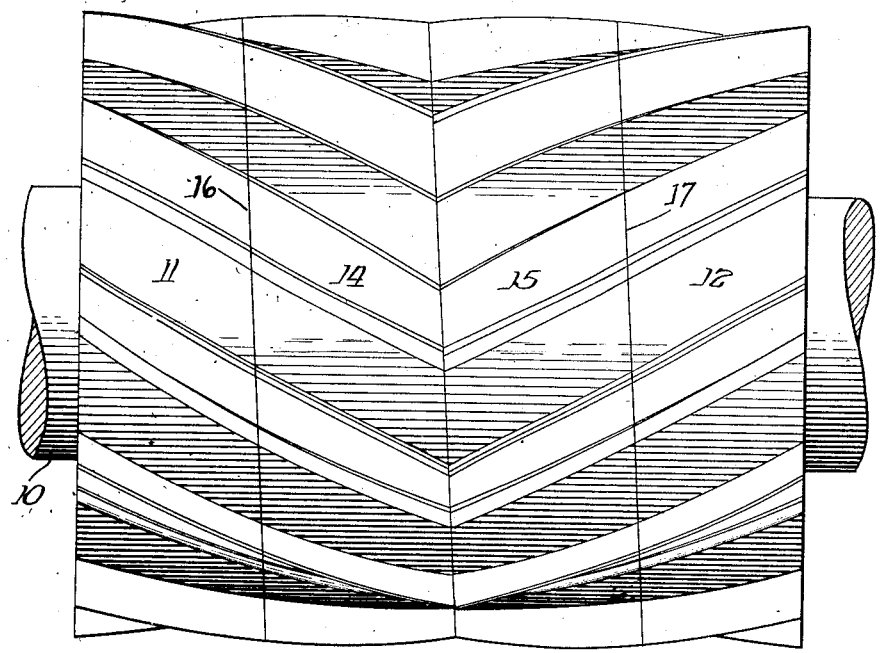
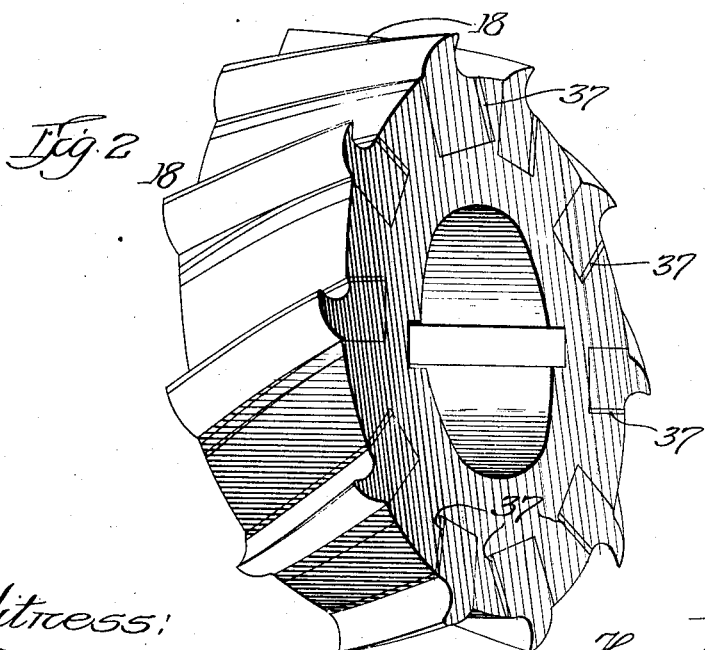

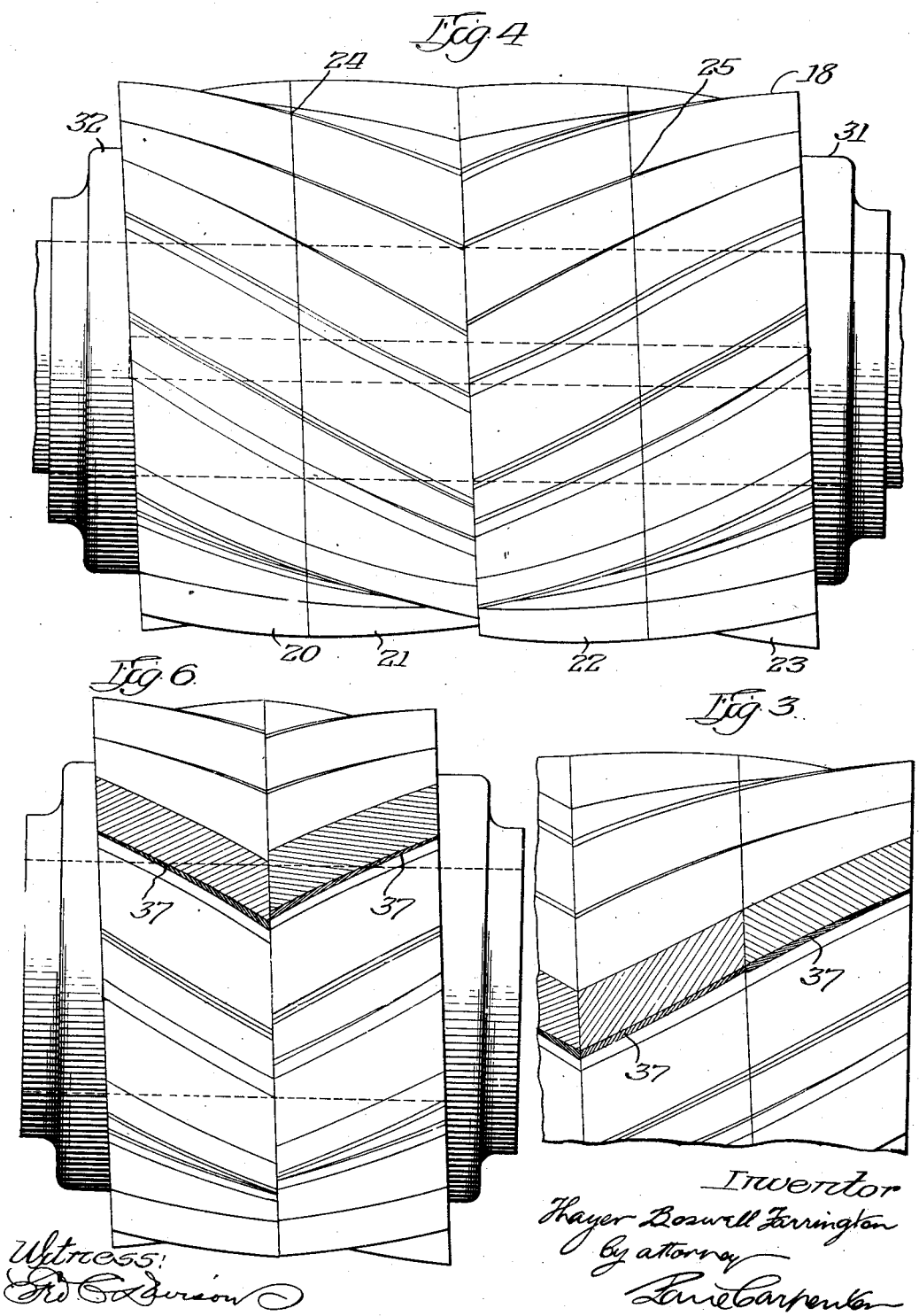

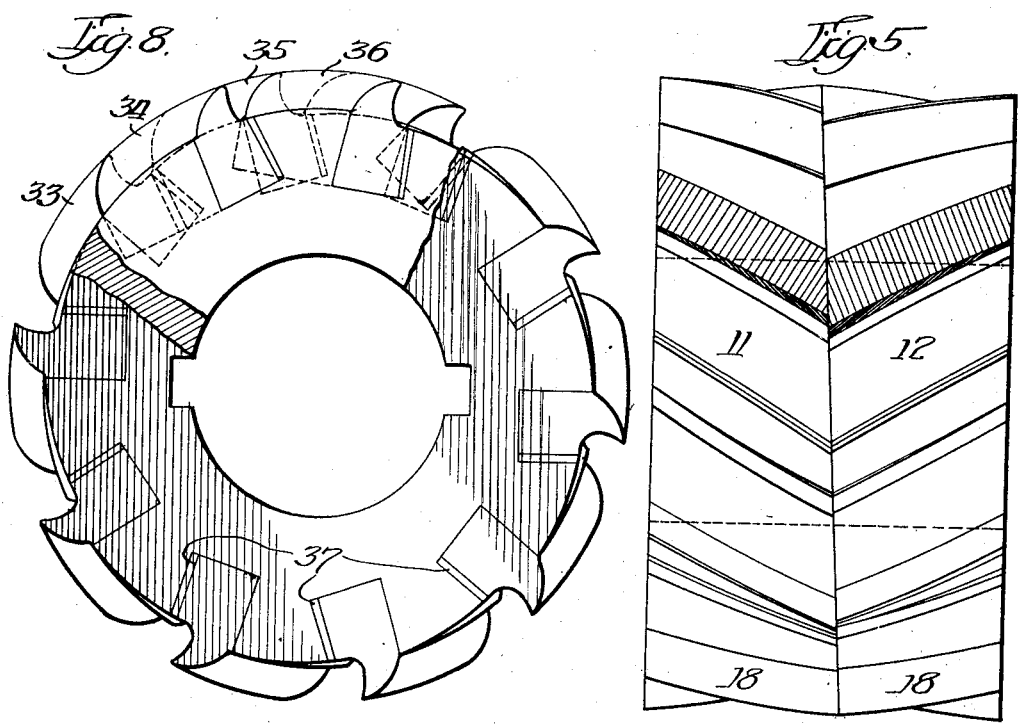

Patented May 14, 1929.

1,713,273

UNITED STATES PATENT OFFICE.

THAYER BOSWELL FARRINGTON, OF COLUMBUS, OHIO.

SECTIONAL MILLING CUTTER.

Application filed March 6, 1922. Serial No. 541,555.

My present invention relates generally to cutters and particularly, to sectional cutters adapted for variation in contour and for replacement of worn parts, and more specifically involves the use of inserted cutting edges.

The principal objects and advantages of this invention are to provide an improved form of sectional milling cutter wherein the cutting edge both as to contour and dimension may be varied to suit conditions; wherein the cutter may be more conveniently supported on a shaft for rotation; wherein the adjacent sections may be conveniently assembled and are so related that ridges will not be left on the work and in which chips or particles of the work cannot accumulate between the sections and thus clog the device or otherwise impair the cutting action; and wherein the cutting edges are removable for replacement or repair; wherein the stresses and strains are evenly distributed and wherein the joints between sections are prevented from chipping or fraying.

This invention has as further objects the provision of a milling cutter wherein the strain is distributed evenly according to the contour of the device; wherein lateral displacement of the cutting edges is prevented; and wherein an improved wedge means is afforded for preventing longitudinal or rotative relative displacement of the sections on a shaft, together with such other objects and advantages as may appear.

The distribution of strain in the present invention and the prevention of ridges on the work is accomplished, as will hereinafter appear, but the provision of an improved compound cutting edge and more particularly a reversely curved cutting edge which is, in effect, a double spiral as will more clearly appear as this description proceeds.

While I have shown and described my invention as embodied in certain types of milling cutters, it will be understood that this has been done merely for purposes of illustration, as it will be understood that my invention is capable of embodiment in other relationships.

Thus, in the accompanying drawings:

Figure 1 is elevational view of one embodiment of my present improvements;

Figure 2 is a perspective view of one of the sections of Figure 1;

Figure 3 is a fragmentary sectional view of the structure of Figure 1;

Figure 4 is an elevational view of another embodiment of my invention;

Figures 5 and 6 are fragmentary sectional views of further embodiments of my invention;

Figure 7 is an elevational view of a further embodiment of my invention; and

Figure 8 schematic view, partly in section, of the lateral faces of adjacent cutter members.

Referring first more particularly to Figure 1 of the drawings, it will be observed that the cutter is here shown as of the rotary milling type, keyed to a shaft 10. This cutter takes the form of a sectional structure made up of two end sections, 11, 12, and any desired number of intermediate sections, two such intermediate sections being shown at 14, 15, for purposes of illustration.

These intermediate sections are intended to vary the breadth of the cutting action of the cutter. By the addition or removal of sections, the length of the cutter and correspondingly the width of the cut may be closely determined.

The end sections, 11, 12, each have their inner faces inclined relatively to the longitudinal axis of the shaft and preferably into parallelism with each other, and the outer faces of the sections shown are perpendicular to the axis of rotation of the shaft, 10, although this feature may be varied as will hereinafter appear.

The intermediate sections 14, 15, are so formed that they are generally inclined bodily, with reference to the shaft, 10, the shaft bearing of each of these sections being formed so as not only to permit of such inclination but also to support and sustain the section directly from the shaft.

The lateral faces of these intermediate sections 14, 15, are inclined as shown preferably also into parallelism with each other and with the inner faces 16 and 17 of the end sections 11, 12.

It will be understood that each of the several end sections 11, 12, and intermediate sections 14, 15, bear such cutting edges as may be determined (an example being shown in Figure 2), and preferably in a manner and in a relationship hereinafter to be more fully set forth.

In the manner above described I attain a cutter structure which not only can be readily assembled and disassembled, and which permits of sectional replacement, but also a cutter in which I attain both the desired overlap of effective cutting on the work to prevent the formation of ridges on the work and also the desired degree of such overlap. This overlap is secured by virtue of the inclination of the sides of the cutter sections with respect to a diametrical line which would be the mean line of the area covered by the inclination of said sides during rotation.

I furthermore can gain any desired variation in the width of the cutting action without affecting, much less sacrificing, such predetermined overlap as may be desired.

Furthermore I render possible uniformity not only of intermediate sections but also standardization of all sections, as will be understood from considering a further embodiment of the invention shown in Figure 4 to be hereinafter more fully described.

Variation in contour, as well as in size, of the cut to be made is attainable by the use of my invention in a manner such as is shown for example in Figure 7, likewise hereinafter more fully to be described.

I also am enabled by the employment of my invention to provide cutting edges of contours which heretofore could not be attained save with great difficulty, if at all, of which the embodiment illustrated in Figure 4, is an example.

As will be apparent on analysis of the disclosure of Figure 2, the cutting edges 18, which may be of such desired number as may meet the service contemplated, are arranged in a generally spiral form, and are preferably replaceable, being held in position in a manner to be hereinafter pointed out.

By utilizing standard homologous sections having angular cutter edges thereupon, and associating these sections in predetermined positions I am enabled to attain a cutter structure which will give a symmetrical or proportionate or other desired distribution of strain.

For example, the cutter structure of Figure 4 is made up of a number of sections, four being shown for purposes of illustration, and grouped couples being numbered in this figure as 20—21 and 22—23.

These sections are each substantial duplicates in basic design and are provided with generally spiral teeth 18, formed with the same pitch. The sections 20 and 21 are so associated that the group has substantially continuous cutting edges, and the sections 22 and 23 are similarly grouped.

By arranging these two groups of sections on the shaft 10, so as to have their respective cutting edges 24, 25, in reversed position and, with the adjacent ends of the sections in each group in substantial registry, the cutting action of the cutter structure will be so symmetrically distributed as to balance the load on the structure and avoid lateral thrust, chattering, chip clogging and other undesirable action.

In this manner I am also enabled to provide a construction by which any desired load distribution can be secured by arranging the sections and the character of the cutting edges so as to compensate for character of the material to be acted upon or the work to be performed thereupon.

For example, in Figure 7 I show a cutter construction which is arranged to form a cut whose depth varies transversely. Thus, on viewing this Figure 7 it will be observed that I make use of two end sections 26 and 27, which are adapted to form the desired rounded contour at the sides of the cut with a flat cut intermediate the margins.

By varying the number of intermediate sections 29 and 30, the width of the flat cut can be varied and similarly by varying the character of the end sections the contours of such margins can be varied.

Again referring to Figure 4, it will be observed that each of the four sections, which are essentially substantial duplicates as previously pointed out, is generally inclined with reference to the shaft 10, the four being secured together thereon by means of end collars 31, 32. In this manner I attain the desirable objectives above suggested without sacrificing the attainment of the desired overlap and thus avoid the formation of inequalities here also.

Figure 8 illustrates schematically the relationship of the cutting edges on adjacent sections of the structure whereby the overlapping cutting action is attained by the abutting pairs of cutters 33—34 and 35—36, each of which rests in part against the body of an adjacent cutter section. It will be seen that the blade member 34 of the front section abuts and has its cutting edge registering with the cutting edge of the member 33 of the rear section, as at 33$^a$, and similarly the members 35 and 36 abut as at 35$^a$. This insures the spiral blade being continuous and preventing ridges on the work, besides the blades reinforce each other where they are most likely to chip.

Where removable cutter members 18, are employed in connection with my improved sectional structure, I preferably make use of a wedge key 37 (see Figure 2) which is illustrated sectionally in Figure 3.

The cutter members 18 themselves may also be given a tapered form in part, for more efficient co-action with the wedge members 37.

Upon viewing Figure 3 of the drawing it will be observed that these tapered wedges 37 and members 18$^a$ are so arranged in the sectional supports that the widest portions of both are arranged side by side and in the end sections are preferably adjacent to the face of the proximate members.

As a result of this arrangement the wedge members 37 and the cutters 18$^a$ are locked in position due not only to their juxtaposition, but also to their association with the adjacent section or sections.

Thus, Figure 5 illustrates this manner of wedging employed in a sectional cutter having all intermediate sections removed, and Figure 6 on the other hand illustrates this wedging between two adjacent inclined sections.

It will be observed that keyways are shown in some of the figures of the drawings, the purpose being to afford means for positively connecting the cutter sections to the shaft where the end members 31 and 32 are not employed.

On consideration of the foregoing specification, and with special reference to Figures 4 and 6, where both lateral faces of each of the sections 20, 21 are shown as disposed generally with an inclination to the longitudinal axis of the structure, and the shaft 10, it will be observed that by virtue of the employment of the collars 31, 32 (which may be keyed to the shaft 10,) and in view of the inclined inner faces of said collars, the said sections 20, 21 are held firmly in position on shaft 10. Provided the angle of inclination of the faces of the sections 20, 21 and the coacting faces of the collars 31, 32 be sufficient, such angle being dependent upon the size of the cutter and the load carried, which are determinating factors, any rotary movement of the cutters is inhibited by a resultant binding or cramping action on the shaft 10, and against the inner faces of said collars 31 and 32 as will readily be appreciated.

A great advantage of this feature of construction resides in the fact that it permits the employment of inserted-tooth cutters of less diameter than have heretofore been possible, since by my present construction I am enabled to dispense with the retaining key and key-way hitherto employed and consequently requiring the use of a greater mass of material between the shaft and the cutter edges in order to avoid weakening of the body of the cutter.

This simplification of the structure has further marked advantages in the way of reducing the cost of production of the sections 20, 21, since the cost of cutting the key-ways and accurately and precisely locating them is avoided.

Having thus described my invention and illustrated its use, what I claim as new and desire to secure by Letters Patent is:—

1. A rotary cutter comprising a plurality of cutting sections having cutting edge members, a shaft on which said sections are mounted directly and in contact therewith, the adjacent surfaces of said sections and cutting edge members being complementally inclined with respect to the axis of each and in snug surface contact, and means for maintaining contact between each of said sections and the shaft whereby they are prevented from independent vibration, separation or relative rotation on said shaft.

2. A rotary cutter comprising a plurality of cutting sections, a shaft on which said sections are mounted directly and in contact therewith, the adjacent surfaces of said sections being complementally inclined with respect to the axis of each and in snug surface contact, to form a substantially continuous cutting edge, and means for maintaining the sections in snug surface contact with each other and with said shaft to dampen vibration of a section by an adjacent section to prevent separation of the sections or relative rotation thereof on said shaft.

3. A rotary cutter comprising a plurality of cutting sections, a shaft on which said sections are mounted directly and in contact therewith, the adjacent surfaces of said sections being complementally inclined with respect to the axis of each and in snug surface contact, and said sections being provided with complemental curved cutting elements whose end faces are in snug surface contact to dampen vibration thereof in use, and means for maintaining such surface contact by compression exerted on said sections between each other and said shaft.

4. In a device of the character described, in combination, a cutter comprising a plurality of separate cutting sections having each a plurality of complemental curved cutting elements, the adjacent surfaces of said sections being inclined with respect the the axis of the device and means for maintaining said surfaces and the end surfaces of said cutting elements in close contact to afford substantially continuous curved cutting elements throughout said cutter.

5. In a rotary cutter, a plurality of individual cutting sections in close contact, to form an uninterrupted cutting head, each section having a plurality of complemental helical cutting blades, the adjacent surfaces of said sections and said blades being inclined to the axis of said cutter and means for maintaining said sections and blades in abutting contact to afford substantially continuous helical cutting blades.

6. In a device of the character described, in combination, a cutter comprising a plurality of separate cutting sections having each a plurality of removable complemental curved cutting vanes, the adjacent surfaces of said sections, and the abutting end surfaces of said vanes being cut at an inclination with respect to the axis, and means for maintaining the surfaces of said sections and the complemental end surfaces of said vanes being in direct contact to afford substantial continuous curved vanes throughout the cutter.

7. In a device of the character described, a cutter head comprising a plurality of abutting sections having their adjacent surfaces lying in planes out of perpendicular relation with the axis of the cutter head, a plurality of cutting elements carried by each of said sections and forming separate portions of spiral cutting blades and aligned to form continuous substantially uniform cutting edges, the abutting end surfaces of said cutting elements being in planes coincident with those of the cutter head sections.

8. In a device of the character described, a cutter head comprising a plurality of abutting sections having their adjacent surfaces lying in planes out of perpendicular relation with the axis of the cutter head, a plurality of removable cutting elements carried by each of said sections and forming separate portions of spiral cutting blades, the abutting end surfaces of said cutting elements being in planes coincident with those of the cutter head sections, and means for fixedly securing said cutting elements to said cutter head sections.

9. In a device of the character described, a cutter head comprising, in combination, a plurality of separate sections having each a plurality of complemental removable sectional cutting vanes, the end faces of said sections and said vanes being disposed in planes at an inclination to a plane perpendicular to the axis of the cutting sections, said end faces being in abutting relation to afford a plurality of continuous curved cutting vanes or blades, and wedge means for securing said sectional cutting vanes in said cutter sections.

10. A rotary cutter comprising a body including separate sections having each a plurality of complemental cutting elements thereon, said sections being bodily inclined with respect to the longitudinal axis of the device and having their adjacent surfaces in direct contact, and said cutting elements also having inclined end faces in abutment to afford a plurality of substantially continuous cutting edges throughout the body of the cutter.

11. In a device of the character described, in combination, a composite cutter construction comprising inclined removable cutter sections variable in number without impairing the operativeness of the device, the cutting edges and adjacent surfaces of the sections being arranged in overlapping alined abutting relationship irrespective of the number of sections.

12. In a device of the character described, a shaft, a cutter structure comprising end cutter sections generally normal to the axis, and one or more intermediate spacing cutters arranged generally at an inclination to the axis of the shaft and cooperating with the end sections to form a substantially continuous cutter.

13. In a device of the character described, a shaft, a cutter structure comprising end cutter sections generally normal to the axis, and one or more intermediate spacing cutters sustained and supported by the shaft and the adjacent cutter members at an inclination to the shaft and cooperating with the end sections to form a substantially continuous cutter.

14. In a device of the character described, a cutter structure comprising, in combination, a shaft, and a cutter section bodily inclined relatively to said shaft rotatably mounted thereon, and means including complemental cutter sections for cramping said cutter section on said shaft.

15. A rotary cutter comprising a body including separate sections having each a plurality of complemental helical cutting elements thereon, said sections being bodily inclined with respect to the longitudinal axis of the device and having their adjacent surfaces in direct contact, and said cutting elements also having inclined end faces in abutment to afford a plurality of substantially continuous helical cutting edges throughout the body of the cutters.

16. A rotary cutter comprising a body including separate abutting sections having each a complemental curved and diagonally arranged cutting element thereon for abutment when the sections are assembled to form a substantially continuous helical cutting edge, and a removable outer section generally inclined with respect to the axis of rotation and having a complemental diagonally arranged cutting edge thereon.

17. In a device of the character described, in combination, a composite cutter construction including inclined sections having their end surfaces in intimate contact, each of said sections having a separate curved cutting element thereon and being assembled so that said cutting elements abut to afford a substantially continuous curved cutting edge.

18. In a rotary cutter, a body including separate abutting sections having each a plurality of complemental wedge shaped grooves and cutting elements therein, said sections and the end lateral faces of said cutting elements being in intimate contact and the cutting edges in alinement to form continuous cutting edges, and a plurality of wedge members complemental to said cutting elements in said grooves for retaining the cutting elements, said wedge members being in abutment, and retained by wedge members of adjacent sections.

19. In a rotary cutter, a body including separate abutting sections having each a plurality of complemental wedge shaped grooves and cutting elements therein, said sections and the end lateral faces of said cutting elements being in intimate contact and the cutting edges in alinement to form continuous cutting edges, and a plurality of wedge members complemental to said cutting elements in said grooves for retaining the cutting elements, said wedge members being in abutment, and said cutting elements and wedge members being retained by abutment with and removable only in a direction toward and adjacent section.

20. A rotary cutter comprising a plurality of cutting sections having cutting edge members, a shaft on which said sections are mounted directly and in contact therewith, the adjacent surfaces of said sections and cutting edge members being complementally inclined with respect to the axis of each and in snug surface contact, means for retaining said cutting edge members against removal except in the direction of a contacting member, and means for maintaining contact between each of said sections and the shaft and said retaining means whereby the latter and said sections are prevented from independent vibration, separation or relative rotation on said shaft.

In testimony whereof I have hereunto signed my name.

THAYER BOSWELL FARRINGTON.